3,360,381
PRESERVATION OF MEAT COLOR
Basil G. Tarladgis, Fair Lawn, N.J., assignor to Lever Brothers Company, New York, N.Y., a corporation of Maine
No Drawing. Filed July 26, 1966, Ser. No. 567,836
Claims priority, application Australia, Apr. 30, 1962, 17,040
20 Claims. (Cl. 99—157)

ABSTRACT OF THE DISCLOSURE

This application discloses a method for stabilizing the color of meat products characterized by electron donating compounds such as heterocyclic nitrogen compounds. Specific materials disclosed in this application for stabilizing meat color include purine, pyrimidine, imidazole, pyrazine, triazine and similar ring systems.

---

This application is a continuation-in-part of my copending U.S. patent application Ser. No. 275, 215, filed Apr. 24, 1963 now abandoned.

This invention relates to a process for preserving the fresh meat color in cured meats or in fresh meats stored over long periods of time under various conditions. More particularly, this invention relates to a process for preserving the fresh meat color in cured and/or stored fresh meats, and also in processed, reformed, dehydrated, freeze-dried, irradiated, frozen and canned meats and meat products, whereby compounds such as purines, pyrimidines, imidazoles or their derivatives are utilized to accomplish the desired results.

It is well known that the desirable red color of fresh meats fades rapidly during storage under light, vacuum, refrigeration or frozen conditions. The same discoloration is observed in dehydrated and freeze-dried meats. The chemical change responsible for the discoloration of fresh meats is known to be the dissociation of oxygen from oxymyoglobin and the formation of myoglobin. Many substances have been suggested as additives to fresh meats for the purpose of maintaining the red color but none have produced suitable results over the normal periods of meat storage.

The same problem exists with respect to cured meats. The conventional way of curing meats is by addition to fresh meats of a mixture containing sodium chloride, sugar, sodium nitrite and sodium nitrate. The meat is then subjected to heating or smoking. During the latter process, the familiar red color of cured meats is formed. Unfortunately, the cured meat pigments are relatively unstable and fade rapidly, resulting in the loss of the attractive red color. No commercially acceptable solution to this problem has been found to date.

It is therefore an object of the present invention to provide fresh meats with stable red color over prolonged storage periods under light, vacuum, refrigeration or frozen conditions.

A still further object of this invention is to provide dehydrated and freeze-dried meats with stable red color over long storage periods, without the need of refrigeration or freezing.

Another object of this invention is to prevent oxidative changes in the lipid fraction of fresh meats.

Another object of this invention is to provide cured meats with stable red color over long storage periods under light, refrigeration or frozen conditions.

It has been found that the treatment of both fresh and cured meats with certain strongly electron donating compounds e.g. organic heterocyclic compounds containing nitrogen, will preserve the desirable red meat color. Even though the precise chemical mechanisms through which the red color is lost do vary as between the fresh and cured meats, it has been found unexpectedly that these strongly electron donating compounds satisfactorily preserve the red color of both classes of meats. The preferred methods of incorporating these color preserving compounds do, of course, differ with the fresh and cured meats, respectively.

The electron donors of this invention are generally organic compounds preferably those heterocyclic compounds containing nitrogen. Operative compounds include the highly electron donating heterocyclic nitrogen bases such as purine, pyrimidine, imidazole, pyrazine, triazine and similar ring systems, as well as derivatives of these ring systems. Preferred compounds include the purines, pyrimidines, imidazoles and their derivatives.

The purines are basic compounds found in living matter and having a purine-type molecular structure. Specific purines are purine, adenine, guanine, hypoxanthine, xanthine and uric acid. The parent purine compound (imidazo (4,5-d) pyrimidine) has the empirical formula $C_5H_4N_4$.

The pyrimidines are basic compounds found in living matter and having a pyrimidine-type molecular structure. They may be isolated following complete hydrolysis of nucleic acids. Such pyrimidines include uracil, thymine, cytosine and methyl-cytosine. Another pyrimidine is thiouracil. The parent pyrimidine compound (1,3-diazine or miazine) has the structural formula $CHN(CH)_3N$ and is operative in this invention.

Still another important compound is a basic compound found in living matter. Imidazole has the structural formula

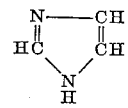

and is one of the most effective compounds found. Obviously chemical equivalents may be substituted, such as compounds of the structure:

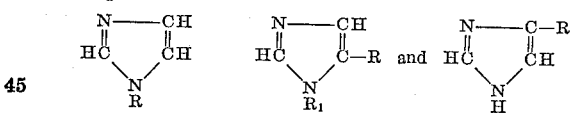

wherein R=methyl or ethyl and $R_1$=hydrogen, methyl or ethyl.

Typical equivalent imidazole derivatives include:
1-methylimidazole
4-methylimidazole
5-methylimidazole
1,5-dimethylimidazole
1-ethylimidazole
4-ethylimidazole
5-ethylimidazole
1,5-diethylimidazole Various suitable derivatives of the purines, pyrimidines, imidazoles and similar ring compounds are those electron donors in which ring substituents have been added, such as alkyl, halo, nitro, alkoxy, amino and similar radicals.

In studying the rapid discoloration of frest meats, the myoglobin, derived from oxymyoglobin and referred to above, has been found to be readily oxidized to metmyoglobin which may induce lipid oxidation. In turn, this oxidation results in color loss. However, it has been found that replacement of the oxygen molecule in the oxymyoglobin with a compound, e.g. purine, having greater affinity to the iron-prophyrin coordination complex than oxygen will stabilize the coordination complex and the iron ion will be kept in the reduced form, thus preserving the red color.

In carrying out the invention, fresh meat is soaked for one minute in a water solution containing 2% purines, pyrimidines, imidazoles, or their derivatives by weight. When fresh meat is to be dehydrated or freeze-dried, it is cut into slices one inch thick and then soaked for ten minutes in a water solution containing 2% purines, pyrimidines, imidazoles or their derivatives. In general, aqueous solutions containing between about 1 and about 6 percent by weight of the electronic donating compound are satisfactory for these applications; however, solutions having as little as 0.1% or as much as 20% of the electron donor may be used.

The use of the procedures outlined provides fresh, dehydrated and freeze-dried meats having the desirable characteristic of retaining a stable red color during storage under conditions of light exposure, vacuum, refrigeration and freezing. In addition, these procedures render such meats much less susceptible to lipid oxidation.

The mechanism for the discoloration occurring in cured meats has also been investigated carefully and several unexpected findings have led to the processes and compositions of this invention.

During the meat curing process, the sodium nitrite-nitrate mixture of the curing ingredients conventionally employed is reduced to nitric oxide, which reacts with the pigment of meats. The compound responsible for the red color of the cured meats is an inner, covalent, diamagnetic, ferrous-porphyrin coordination complex. The $3d$ orbital of the iron is occupied by ten paired electrons, while both $3d_z2$ coordination positions of the iron are occupied by nitric oxide. The above compound is referred to as nitric oxide myochrome.

Nitric oxide myochrome is a very unstable compound. The fading of the cured meat pigments can be brought about either by lipid oxidation or by light dissociation of the nitric oxide from the ferrous-porphyrin coordination complex and subsequent formation of not only metmyochromogen and metmyoglobin, but green pigments also. Both mechanisms involve either removal (ionization) or excitation of electrons from the molecular orbital of the porphyrin ring electron cloud. As this happens, the electrons which are donated by the iron to the nitric oxide for the formation of the $\pi d$ covalent bond are withdrawn, to be "redistributed" toward the electron deficient areas. The bond with nitric oxide is, therefore, weakened and nitric oxide dissociates from the molecule. The iron is now very susceptible to oxidation, the ligand being replaced by electronegative groups present, favoring the formation of an outer, ionic complex. This effect is enhanced by the fact that iron is now unable to donate electrons for sharing in a covalent bond formation. Thus, ferri- or met-myochromogen is formed and ring opening follows both electrophyllic and nucleophyllic attacks in the areas of higher and lower electron density, respectively, of the porphyrin ring electron cloud.

Therefore, during the light induced excitation of electrons of the porphyrin ring $\pi$-electron cloud of the nitric oxide myochrome, the iron ion of this compound is not able to contribute electrons for a $\pi d$ covalent bond formation with an electron withdrawing ligand, such as nitric oxide. In the present invention, electron donating molecules, such as purines, pyrimidines, imidazoles or the derivations thereof, are added to the curing mixture, instead of nitric oxide. In this manner, the coordination complex is stabilized and the iron is kept in the reduced form, thus preserving the red meat color.

In carrying out the invention with respect to cured meats, the fresh meat is ground and mechanically mixed or stirred with a mixture containing sodium chloride, sugar, and the electron donor, e.g. purines, pyrimidines, imidazoles or their derivatives. Ascorbic acid or its salts may also be included in the mixture to enhance reducing conditions. The meat is then subjected to heating or smoking.

The reaction of the chosen electron donating substance with oxymyoglobin takes place upon treatment of the meat with the curing ingredients by the displacement of oxygen as a ligand in the oxymyoglobin molecule. Heating or smoking thereafter is only necessary for the inactivation of proteolytic enzymes. The following curing composition produces very satisfactory results:

2.0% sodium chloride
0.5% sugar
0.02% purines, pyrimidines, imidazoles or their derivatives 0.1% sodium ascorbate This composition, in which the percentages are based upon the weight of meat to be cured, may be applied as a powder directly to the surface of the meat. In addition, or in the alternative, the composition may be put into aqueous solution and injected directly into the meat or arterially pumped throughout the solid chunk of meat. In still another method, the meat may be soaked in a solution of the curing composition.

The meat may be smoked for ten hours to an internal temperature of 155° F. The resultant product provides a pleasing and palatable nutritional food. Here again, a cured meat product is provided which retains a stable red color during storage under varying conditions of light exposure, refrigeration and freezing. The cured meat prepared in this manner also is less susceptible to lipid oxidation.

The color of fresh and cured meats can thus be preserved for significantly longer periods of time.

Spectral studies carried out indicate that the pigment of the cooked cured meats and that of the denatured nitric oxide hemoglobin are inner, covalent, ferrous porphyrin coordination complexes. The spectra of the nitric oxide hemochrome prepared from hemin which was derived from cured meat and that of the acetone extract of the cured meat gives strong evidence that both the coordination positions of the iron in these compounds are occupied by nitric oxide and that globin is not associated with the molecule. Further, electron paramagnetic resonance studies show that the acetone extract of the cured meat pigment is diamagnetic. This compound is referred to as nitric oxide myochrome.

The pigment of the fresh cured meat and that of the nitric oxide hemoglobin are identical. They are inner, covalent, ferrous porphyrin coordination complexes, but the one coordination position of the iron, in these compounds, is occupied by globin and the other by nitric oxide. A small amount of nitric oxide myochrome was found to be present in these pigments.

The addition of strong electron donors to fresh meat and the use of strong electron donors in the curing mixture will stabilize the iron porphyrin coordination complex against light induced dissociation, by donating electrons to the iron and keeping it in the ferrous state.

It is thus seen that the use of highly electron donating heterocyclic nitrogen compounds for this purpose will preserve the red color in meats, both fresh and cured. It is possible that one or more nitrogen atoms of the heterocyclic compound may become tied up or otherwise bonded to the iron atom of the heme derivative responsible for the meat color, thus maintaining the iron in the desired form.

The invention may be illustrated by the following examples:

Example 1

A chunk of fresh beef was immersed for 10 minutes in a solution containing 24% sodium chloride and 2% imidazole by weight. After removal from this solution, the beef showed a bright red color which was retained during refrigerated storage.

Similar results were obtained when repeating the experiment with the following imidazole derivatives:

1-methylimidazole
4-methylimidazole
5-methylimidazole
4-ethylimidazole
5-ethylimidazole

*Example 2*

A chunk of pork was cooked for 30 minutes at 70° C. Subsequently it was immersed in a solution containing 24% sodium chloride and 2% imidazole. After removing the pork from this solution it showed a bright red color which was retained during refrigerated storage.

Obvious modifications may be made in the methods and compositions of the present invention without departing from the spirit or scope thereof and it is to be understood that the invention is to be limited only by the scope of the appended claims.

I claim:

1. A method for preserving the color of meat comprising treating a meat product with a composition consisting essentially of a compound selected from the group consisting of adenine, guanine, hypoxanthine, xanthine, uric acid, uracil, thymine, cytosine, methyl-cytosine, thiouracil, pyrazine, triazine, purine and pyrimidine, in a sufficient amount and for a sufficient time to stabilize the ferrous-porphyrin coordination complex in the meat product, thereby preserving its color.

2. A method according to claim 1, wherein said compound is imidazole (4,5-d) pyrimidine.

3. A method according to claim 1, wherein said compound is adenine.

4. A method according to claim 1, wherein said compound is 1,3-diazine.

5. A method according to claim 1, wherein said compound is thymine.

6. A method according to claim 1, wherein said composition consists essentially of an aqueous solution containing between about 1% and 6% by weight of said compound.

7. A method according to claim 1, wherein said composition is a purine composition consisting essentially of sodium chloride, a sugar and said compound.

8. A method according to claim 1, wherein said composition is a curing composition consisting essentially of sodium chloride, a sugar and imidazole (4,5-d) pyrimidine.

9. A method according to claim 1, wherein said composition is a curing composition consisting essentially of sodium chloride, a sugar and 1,3-diazine.

10. A composition for use in the curing of meats which consists essentially of sodium chloride, a sugar and a compound selected from the group consisting of adenine, guanine, hypoxanthine, xanthine, uric acid, uracil, thymine, cytosine, methyl-cytosine, thiouracil, pyrazine, triazine, purine and pyrimidine, in an amount sufficient to stabilize the ferrous-porphyrin coordination in the meat, thereby preserving the color of the meat when the composition is used to cure the meat.

11. A composition according to claim 10, wherein said compound is imidazole (4,5-d) pyrimidine.

12. A composition according to claim 10, wherein said compound is 1,3-diazine.

13. A composition according to claim 10, containing ascorbic acid in addition to said sodium chloride, sugar and compound.

14. A method for preserving the color of meat comprising treating a meat product with a composition consisting essentially of a compound selected from the group consisting of

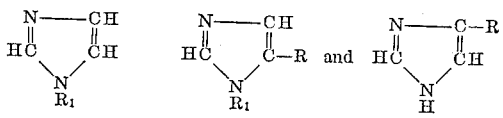

wherein R=methyl or ethyl and $R_1$=hydrogen, methyl or ethyl in sufficient amount and for a sufficient time to stabilize the ferrous-porphyrin coordination complex in the meat product, thereby preserving the color of the meat product.

15. A method according to claim 14, wherein said compound is selected from the group consisting of:

Imidazole
1-methylimidazole
4-methylimidazole
5-methylimidazole
1,5-dimethylimidazole
1-ethylimidazole
4-ethylimidazole
5-ethylimidazole
1,5-diethylimidazole
1-methyl-5-ethylimidazole in sufficient amount and for a sufficient time to stabilize the ferrous-porphyrin coordination complex in the meat product, thereby preserving the color of the meat product.

16. A method according to claim 14, wherein said compound is imidazole.

17. A method according to claim 14, wherein said composition consists essentially of sodium chloride and sugar in addition to said compound.

18. A method according to claim 14, wherein said composition consists essentially of sodium chloride, a sugar and imidazole.

19. A composition for use in the curing of meats which consists essentially of sodium chloride, a sugar, ascorbic acid and a compound selected from the group consisting of:

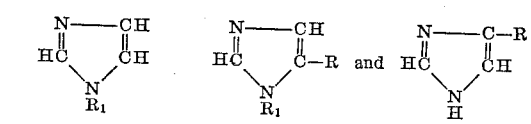

wherein R=methyl or ethyl and $R_1$=hydrogen, methyl or ethyl in sufficient amount and for a sufficient time to stabilize the ferrous-porphyrin coordination complex in the meat, thereby preserving the color of the meat when the composition is used to cure the meat.

20. A composition according to claim 19, wherein said compound is imidazole.

References Cited

UNITED STATES PATENTS

| | | | |
|---|---|---|---|
| 2,491,146 | 12/1949 | Coleman et al. | 99—157 X |
| 2,863,777 | 12/1958 | Dekker | 99—159 |
| 2,963,374 | 12/1960 | Sanders | 99—150 |
| 3,013,885 | 12/1961 | Van Overbeek | 99—150 X |

HYMAN LORD, *Primary Examiner.*